United States Patent
Ghosh et al.

(10) Patent No.: US 12,326,950 B2
(45) Date of Patent: Jun. 10, 2025

(54) INTELLIGENT POLICY MODULE

(71) Applicant: Dell Products L.P., Round Rock, TX (US)

(72) Inventors: Priyamrita Ghosh, Bangalore (IN); Anurag Bhatnagar, Bangalore (IN); Parimal Patil, Bangalore (IN); Rahul Kumar Pathak, Bagaha (IN)

(73) Assignee: Dell Products L.P., Round Rock, TX (US)

( * ) Notice: Subject to any disclaimer, the term of this patent is extended or adjusted under 35 U.S.C. 154(b) by 667 days.

(21) Appl. No.: 17/592,640

(22) Filed: Feb. 4, 2022

(65) Prior Publication Data

US 2023/0252174 A1    Aug. 10, 2023

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC .............................. G06F 21/6218; G06N 20/00
See application file for complete search history.

(56) References Cited

U.S. PATENT DOCUMENTS

| | | | |
|---|---|---|---|
| 8,805,790 B1* | 8/2014 | Chan ................... | G06F 16/1824 707/652 |
| 9,367,573 B1* | 6/2016 | Goyal .................... | G06F 16/22 |
| 9,727,273 B1* | 8/2017 | Dantkale ................ | G06F 11/14 |
| 11,423,091 B2* | 8/2022 | Miller .................. | G06F 16/3347 |
| 12,158,859 B2* | 12/2024 | Van Dyck ............. | G06F 16/128 |
| 2003/0031319 A1* | 2/2003 | Abe .................. | G11B 20/00086 380/232 |
| 2012/0254364 A1* | 10/2012 | Vijayan ................... | H04L 65/60 709/219 |
| 2014/0279304 A1* | 9/2014 | Lall ................... | G06F 16/24564 705/30 |

(Continued)

OTHER PUBLICATIONS

Katari, Abhilash. "Conflict Resolution Strategies in Financial Data Replication Systems."; International Journal of Science and Research, 2008, pp. 1974-1982. (Year: 2008).*

(Continued)

*Primary Examiner* — Kari L Schmidt
(74) *Attorney, Agent, or Firm* — Krishnendu Gupta; Lesley Leonessa

(57) ABSTRACT

Methods, system, and non-transitory processor-readable storage medium for a policy proposal system are provided herein. An example method includes applying at least one policy to data stored on a storage system to identify matched data, where the matched data is data to be moved from the storage system to a secondary storage system. The policy proposal system identifies unmatched data stored on the storage system, where the unmatched data is data that is not identified as the data to be moved from the storage system to the secondary storage system. The policy proposal system trains a machine learning system with the matched data and the unmatched data. The policy proposal system predicts at least one new policy, where application of at least one new policy identifies at least a subset of the unmatched data to be moved from the storage system to the secondary storage system.

20 Claims, 5 Drawing Sheets

(56) References Cited

U.S. PATENT DOCUMENTS

| | | | |
|---|---|---|---|
| 2017/0235808 A1* | 8/2017 | Salame | H04L 67/1095 |
| | | | 707/625 |
| 2017/0308557 A1* | 10/2017 | Cassidy | G06N 20/00 |
| 2018/0181644 A1* | 6/2018 | Lyons | G06F 16/951 |
| 2018/0191732 A1* | 7/2018 | Erciyes | H04L 63/107 |
| 2019/0250839 A1* | 8/2019 | Bedadala | G06F 3/0653 |
| 2019/0251057 A1* | 8/2019 | Robinson | G06F 18/211 |
| 2019/0370388 A1* | 12/2019 | Li | G06F 40/295 |
| 2020/0241773 A1* | 7/2020 | Kannery | G06F 3/0658 |
| 2021/0035116 A1* | 2/2021 | Berrington | G06N 5/04 |
| 2021/0049074 A1* | 2/2021 | Bezerra Maimoni | G06F 11/1461 |
| 2022/0091940 A1* | 3/2022 | Kumar | G06F 11/1451 |
| 2022/0171553 A1* | 6/2022 | Bedadala | G06F 3/0638 |
| 2024/0386330 A1* | 11/2024 | Ajmera | G06N 5/01 |

OTHER PUBLICATIONS

Cochinwala, Munir, et al. "Efficient data reconciliation." Information Sciences 137.1-4 (2001): 1-15. (Year: 2001).*

A. R. Mohammed, S. A. Mohammed and S. Shirmohammadi, "Machine Learning and Deep Learning Based Traffic Classification and Prediction in Software Defined Networking," 2019 IEEE International Symposium on Measurements & Networking (M&N), Catania, Italy, 2019, pp. 1-6 (Year: 2019).*

* cited by examiner

INTELLIGENT POLICY MODULE

FIELD

The field relates generally to information processing, and more particularly to applying a policy to data on information processing systems to maximize the amount of data moved from primary storage to secondary storage systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, data storage utilizes cloud-based storage resources in addition to local storage resources of the storage systems. Policies are defined to match data, for example, files greater than a particular size, to identify data that is to be transferred to, for example, the cloud-based storage resources.

SUMMARY

Illustrative embodiments provide techniques for implementing a policy proposal system in a storage system. For example, illustrative embodiments apply at least one policy to data stored on a storage system to identify matched data, where the matched data is data to be moved from the storage system to a secondary storage system. The policy proposal system identifies unmatched data stored on the storage system, where the unmatched data is data that is not identified as the data to be moved from the storage system to the secondary storage system. The policy proposal system trains a machine learning system with the matched data and the unmatched data. The trained machine learning system predicts at least one new policy, where application of the new policy identifies at least a subset of the unmatched data to be moved from the storage system to the secondary storage system. These and other illustrative embodiments include, without limitation, apparatus, systems, methods and processor-readable storage media.

DETAILED DESCRIPTION

Figure 1:
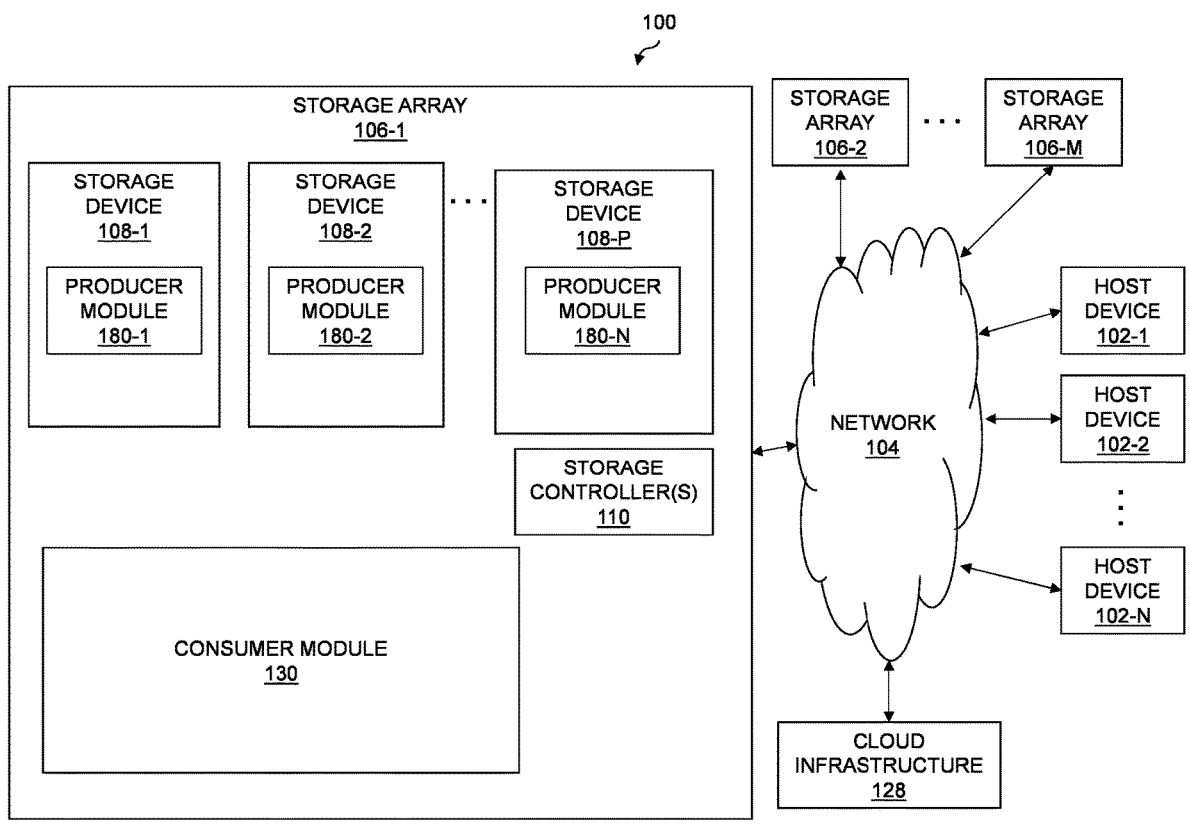
FIG. 1 is a block diagram of an information processing system including a storage array configured with a policy proposal system in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Described below is a technique for use in implementing a policy proposal system, which technique may be used to provide, among other things, application of at least one policy to data stored on a storage system to identify matched data, where the matched data is data to be moved from the storage system to a secondary storage system. The policy proposal system identifies unmatched data stored on the storage system, where the unmatched data is data that is not identified as the data to be moved from the storage system to the secondary storage system. The policy proposal system trains a machine learning system with the matched data and the unmatched data. The trained machine learning system predicts at least one new policy, where application of the new policy identifies at least a subset of the unmatched data to be moved from the storage system to the secondary storage system.

Conventional technologies do not provide a method for creating an optimized policy for the storage system. Conventional technologies do not provide intelligent management of primary and secondary storage space consumption. Conventional technologies do not provide an efficient method for policy creation for better management of unstructured data. Conventional technologies rely on users to manually configure policies to define the data to be transferred from the storage system to secondary storage. Conventional technologies rely on customers creating policies from previous versions of products instead of creating policies from live data.

By contrast, in at least some implementations in accordance with the current technique as described herein, a policy is predicted for optimizing storage space consumption on the storage system by applying at least one policy to data stored on a storage system to identify matched data, where the matched data is data to be moved from the storage system to a secondary storage system. The policy proposal system identifies unmatched data stored on the storage system, where the unmatched data is data that is not identified as the data to be moved from the storage system to the secondary storage system. The policy proposal system trains a machine learning system with the matched data and the unmatched data. The trained machine learning system predicts at least one new policy, where application of the new policy identifies at least a subset of the unmatched data to be moved from the storage system to the secondary storage system.

Thus, a goal of the current technique is to provide a method and a system for creating an optimized policy for storage space consumption on the storage system. Another goal is to predict a policy that will maximize the amount of data being moved from primary storage to secondary storage while simultaneously predicting a policy that is close to the existing policy. Another goal is to provide intelligent management of primary and secondary storage space consumption. Another goal is to provide an efficient method for policy creation for better management of unstructured data.

Yet another goal is to create policies from live data. Yet another goal is to create a new optimized policy from an existing policy.

In at least some implementations in accordance with the current technique described herein, the use of a policy proposal system can provide one or more of the following advantages: providing intelligent management of primary and secondary storage space consumption, creating an optimized policy for the storage system, providing a user with predictive output to create a new policy that optimizes storage space consumption, and avoiding reliance on users to manually configure policies that identify data to be transferred from the storage system to secondary storage.

In contrast to conventional technologies, in at least some implementations in accordance with the current technique as described herein, a policy is predicted for optimizing storage space consumption on the storage system by applying at least one policy to data stored on a storage system to identify matched data, where the matched data is data to be moved from the storage system to a secondary storage system. The policy proposal system identifies unmatched data stored on the storage system, where the unmatched data is data that is not identified as the data to be moved from the storage system to the secondary storage system. The policy proposal system trains a machine learning system with the matched data and the unmatched data. The trained machine learning system predicts at least one new policy, where application of the new policy identifies at least a subset of the unmatched data to be moved from the storage system to the secondary storage system.

In an example embodiment of the current technique, the trained machine learning system modifies the policy to create the new policy.

In an example embodiment of the current technique, the machine learning system predicts an amount of data moved from the storage system to the secondary storage system as a result of the application of at least one new policy.

In an example embodiment of the current technique, the trained machine learning system predicts at least one new policy to optimize storage space consumption on the storage system.

In an example embodiment of the current technique, the trained machine learning system predicts at least one new policy based on at least one of attributes of files associated with file systems residing on the storage system and ownership of the files associated with the file systems residing on the storage system.

In an example embodiment of the current technique, the machine learning system analyzes the unmatched data against at least one policy.

In an example embodiment of the current technique, the machine learning system analyzes the unmatched data to identify at least one new policy.

In an example embodiment of the current technique, the machine learning system analyzes the unmatched data and historical data from a database comprising a plurality of policies.

In an example embodiment of the current technique, the policy proposal system predicts at least one new rule, where the rule is comprised of at least one expression that, when applied to the data on the storage system, identifies data that matches the expression, where the policy is comprised of the rule.

In an example embodiment of the current technique, the policy proposal system predicts at least one expression that matches the subset of the unmatched data.

In an example embodiment of the current technique, at least one expression comprises at least one of file size and access time of at least one file, where at least one file resides on a storage device on the storage system.

In an example embodiment of the current technique, the policy proposal system provides at least one new rule comprising at least one expression to a user for creation of at least one new policy, and provides a prediction of an amount of data moved from the storage system to the secondary storage system as a result of application of at least one new policy.

In an example embodiment of the current technique, the unmatched data is identified in response to the application of at least one policy to the data stored on the storage system.

In an example embodiment of the current technique, a consumer module on the storage system pushes at least one policy to a producer module residing on a storage device on the storage system.

In an example embodiment of the current technique, the producer module applies at least one policy to a storage device residing on the storage system, and transfers the unmatched data to a consumer module for analysis.

In an example embodiment of the current technique, the producer module gathers the matched data and the unmatched data in response to the application of at least one policy.

In an example embodiment of the current technique, a consumer module receives the unmatched data, where the consumer module comprises a data pool manager and a data analyzer engine, where the data pool manager receives the unmatched data from a producer module, and where the machine learning system resides on the data analyzer engine.

In an example embodiment of the current technique, the data pool manager obtains at least one policy from a database that comprises a plurality of policies, and transmits the policy and the unmatched data to the data analyzer engine for analysis by the machine learning system.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 each comprise a producer module 180. The functionality of the producer module 180 will be explained in greater detail in FIG. 2. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines (VMs) of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system. For example, although shown as external to the cloud infrastructure 128 in FIG. 1, the storage arrays 106 in some embodiments may be part of one or more clouds of the cloud infrastructure 128. The cloud infrastructure 128 may be, for example, Amazon S3, Azure, Google Cloud Platform (GCP) and/or Dell EMC Elastic Cloud Storage (ECS-S3).

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage arrays 106 may comprise one or more storage arrays such as one or more VNX®, VMAX®, Unity™ or PowerStore™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 4 and 5.

The storage array 106-1 implements a consumer module 130. The consumer module 130 is assumed to be embedded on the storage array 106-1, and provides policy proposal functionality to cloud infrastructure 128. The producer module 180 and the consumer module 130 will be explained in greater detail in FIG. 2. Although not explicitly shown in FIG. 1 for clarity of illustration, it is assumed in some embodiments that other ones of the storage arrays 106-2 through 106-M implement respective additional instances of the consumer module 130, as well as respective sets of storage devices and storage controllers in a manner similar to that described herein with respect to storage array 106-1.

The cloud infrastructure 128 may comprise one or more clouds, including one or more public clouds, one or more private clouds, one or more hybrid clouds that include both private cloud and public cloud components, multi-cloud arrangements, combinations thereof, etc. The cloud infrastructure 128 is therefore assumed to comprise one or more clouds, each having respective sets of cloud resources such as compute, storage and network resources in various configurations.

The consumer module 130, as illustrated in FIG. 1, is embedded into the storage array 106-1 and may be deeply integrated therein such that, from a host device 102 or user perspective there is a seamless user experience with respect to other features of the storage array 106-1. Although shown as separate from storage controllers 110 in FIG. 1 for clarity of illustration, it should be appreciated that the consumer module 130 may be implemented at least in part internal to the storage controllers 110. For example, the storage controllers 110 may be implemented utilizing one or more processing devices each comprising at least one processor coupled to at least one memory. The consumer module 130 may be implemented as virtualization software running on such processing devices.

At least portions of the consumer module 130 may be implemented at least in part in the form of software that is stored in memory and executed by a processor.

It is to be understood that the particular set of elements shown in FIG. 1 for optimizing storage space consumption on the storage system using a policy proposal system is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

As will be described in further detail elsewhere herein, logic may be implemented for optimizing storage space consumption on the storage system using a policy proposal system.

Figure 2:
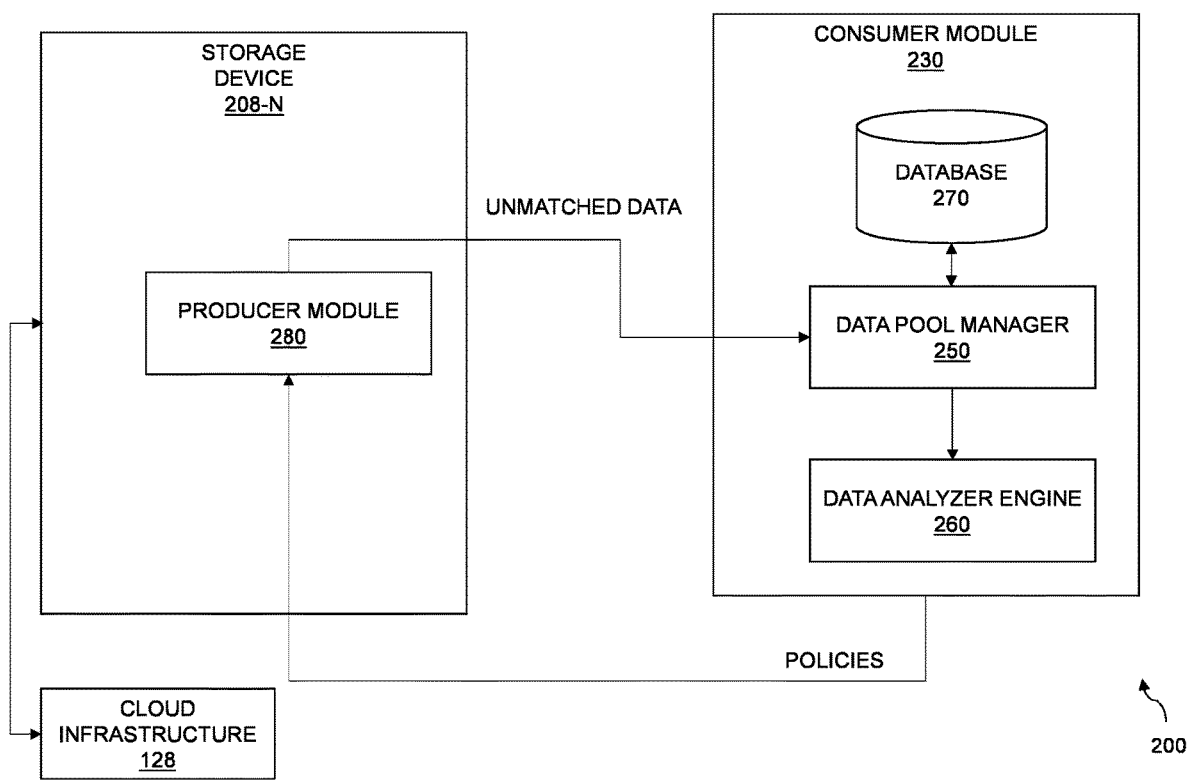
FIG. 2 shows a flow diagram of an example interaction between a producer module and a consumer module in a policy proposal system in an illustrative embodiment.

FIG. 2 illustrates a flow diagram of an example interaction between a producer module and a consumer module in a policy proposal system in an illustrative embodiment.

The policy proposal system 200 comprises a producer module 280 and a consumer module 230. In an example embodiment, the policy proposal system 200 may be implemented in any storage application utilizing policies and/or criteria for effective data management. In an example embodiment, the policy proposal system 200 may be implemented in data mobility applications. In an example embodiment, the policy proposal system 200 may also be implemented in cloud tiering and restore applications. In an example embodiment, when the policy proposal system 200 is integrated within a cloud mobility application, the storage array 106 may comprise a cloud mobility appliance container (not shown) comprising a cloud mobility core stack (not shown) and a database 270. In an example embodiment, the cloud mobility core stack may comprise the consumer module 230. In an example embodiment, the storage device 208-N comprises the producer module 280. In an example embodiment, the storage device 208-N may be a software defined storage container comprising one or more networked attached storage (NAS) (not shown). Each NAS may contain one or more filesystems. The software defined storge container may also contain a cloud mobility engine (not shown). In an example embodiment, the producer module 280 may reside within the cloud mobility engine. In an example embodiment, policies may be defined by a user on the storage array 106.

In an example embodiment, the consumer module 230 pushes user defined policies to the producer module 280. The policy proposal system 200 applies the policies to the data on the storage system. For example, the policy proposal system 200 applies a single policy to the data on the storage system. The data set of the data that matches the policy is transferred to the cloud infrastructure 128 to free up space on the storage system. The data set of the data that does not match the policy (i.e., the unmatched data) is identified, and maintained within the producer module 280. In an example embodiment, the producer module 280 pushes the unmatched data to the consumer module 230 for additional analysis of the unmatched data. The unmatched data is then analyzed against the policy.

In an example embodiment, the consumer module 230 comprises two sub modules, a data pool manager 250 and a data analyzer engine 260, along with the database 270. The database 270 contains user defined policies. The data pool manager 250 provides both the unmatched data and the policy from the database 270 to the data analyzer engine 260 for analysis. In other words, the inputs to the consumer module 230 are the policy and the unmatched data that resulted from the application of the policy. The data analyzer engine 260 performs the analysis of the unmatched data against the policy.

In an example embodiment, the data analyzer engine 260 predicts a new policy. The new policy may be an entirely new policy, or modification of an existing policy (i.e., the existing policy against which the unmatched data is generated). In either case, the predicted policy optimizes the amount of data that is moved to the secondary storage system. In an example embodiment, the data analyzer engine 260 predicts a new policy that is close to the existing policy so as to meet user requirements.

In an example embodiment, the data analyzer engine 260 provides predictive output to the user. The predictive output comprises expressions that can be used to create rules within a policy. The format of the predictive output will be explained in greater detail in FIG. 3. The data analyzer engine 260 also predicts an amount of primary storage space that will be freed (i.e., transferred to secondary storage) upon application of the policy generated using the predictive output.

It should be appreciated that the policy proposal system described with respect to FIG. 2 is presented by way of example only, and that embodiments are not limited solely to use as described in FIG. 2. The policy proposal system 200, for example, may be run on a different storage array, on one of the host devices 102, etc.

Figure 3:
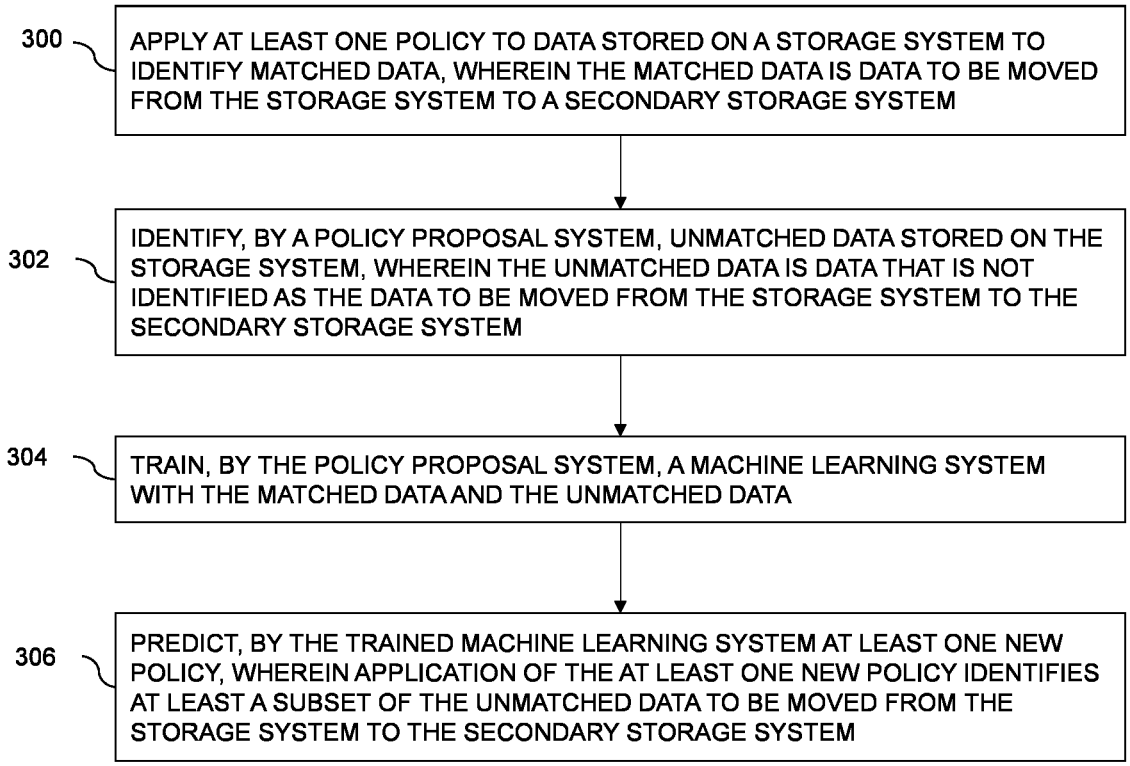
FIG. 3 shows a flow diagram of a process for a policy proposal system in an illustrative embodiment.

An exemplary process for optimizing storage space consumption on the storage system will now be described in more detail with reference to the flow diagram of FIG. 3. It is to be understood that this particular process is only an example, and that additional or alternative processes for optimizing storage space consumption on the storage system may be used in other embodiments.

At 300, the policy proposal system 200 applies at least one policy to data stored on a storage system (i.e., storage device 208-N) to identify matched data, where the matched data is data to be moved from the storage system (i.e., primary storage system) to a secondary storage system. For example, a policy may be applied to a NAS to traverse one or more file systems on the NAS to identify data that match the policy. Those data sets that match the policy are moved to secondary storage, such as the cloud infrastructure 128.

At 302, the policy proposal system 200 identifies unmatched data stored on the storage system, where the unmatched data is data that is not identified as the data to be moved from the storage system to the secondary storage system. In an example embodiment, the unmatched data is identified in response to the application of at least one policy to the data stored on the storage system.

In other words, the consumer module 230 on the storage system pushes at least one policy to the producer module 280 residing on a storage device 208-N on the storage system as explained in FIG. 2. The producer module 280 applies the policy to the files associated with the file systems in the storage device 208-N. The data sets that match the policy are moved to the cloud infrastructure 128. The data sets that do not match the policy are gathered by the producer module 280 and transferred by the producer module 280 to the consumer module 230 for analysis. In an example embodiment, the producer module 280 gathers the matched data and the unmatched data that results after the policy is applied to the files associated with the file systems in the storage device 208-N.

In an example embodiment, the consumer module 230 comprises a data pool manager 250 and a data analyzer engine 260. The machine learning system resides on the data analyzer engine 260. When the consumer module 230 receives the unmatched data from the producer module 280, the data pool manager 250 receives the unmatched data. In an example embodiment, the data pool manager 250 obtains at least one policy from the database 270. In an example embodiment, the database 270 comprises a plurality of policies. The data pool manager 250 holds the live traversal data that is the result of the application of the policy. The data pool manager 250 also references historical data from the database 270. In an example embodiment, the data pool manager 250 transmits the policy and the unmatched data to the data analyzer engine 260 for analysis by the machine learning system.

At 304 the policy proposal system 200 trains a machine learning system with the matched data and the unmatched data. The machine learning system may be one of Logistic/Linear Regression, Ridge Regression, Random Forest, K-Nearest Neighbor, and/or XGBoost. In an example embodiment, the machine learning system is trained using data sets typically found on customer storage systems. As the policy proposal system 200 continues to run, the machine learning system is continually trained using the unmatched data sets that are produced as policies are applied to the storage system.

At 306 the trained machine learning system predicts at least one new policy, where application of the new policy identifies at least a subset of the unmatched data to be moved from the storage system to the secondary storage system. The machine learning system predicts a policy such that at least a portion of the unmatched data matches the predicted policy, and the portion of the unmatched data is moved to the secondary storage system, such as the cloud infrastructure 128. In an example embodiment, the new policy may be an entirely new policy, or modification of an existing policy such that the new policy is similar to the existing policy. In an example embodiment, the policy proposal system 200 predicts a new policy that is close to an existing policy, while, at the same time optimizes the amount of data that is moved to the secondary storage system. In another example embodiment, the policy proposal system 200 predicts a new policy that is close to the existing policy to meet user requirements. In an example embodiment, the policy proposal system 200 may be integrated within the secondary storage to free up space on the secondary storage.

In an example embodiment, the machine learning system predicts the new policy based on the attributes of files associated with file systems residing on the storage system and/or ownership of the files associated with the file systems residing on the storage system.

In an example embodiment, the machine learning system predicts the new policy by analyzing the unmatched data to identify the new policy. Further, in an example embodiment, the machine learning system predicts the new policy by analyzing the unmatched data against the policy. In an example embodiment, the machine learning system analyzes the unmatched data along with historical data from the database 270 where the database 270 comprises a plurality of policies.

In an example embodiment, the policy is comprised of at least one rule. In an example embodiment, the machine learning system predicts at least one new rule, where the rule is comprised of at least one expression. When the expression is applied to the data on the storage system, the data that matches the expression is identified. The identified data that matches all the expressions in rule (i.e., the matched data) is considered for transferred from the storage system to the secondary storage system.

In an example embodiment, when the machine learning system predicts the new rule, the machine learning system predicts at least one expression that matches the subset of the unmatched data. In an example embodiment, the expression comprises at least one of file size and last access time of at least one file, where the file resides on a storage device on the storage system. In an example embodiment, the rule may have the format of:

```
{ Rule 1 :
{ "name":filesize,"Value":10,"Unit":"KB", "Op":">"},
{ "name":atime,"Value":1, "Unit": "year", "Op":">"}},
{Rule 2:
{ "name":filesize,"Value":10,"Unit":"KB", "Op":">"},
{ "name":atime,"Value":1, "Unit": "year", "Op":">"}}
}
```

In an example embodiment, the machine learning system provides a prediction of an amount of data moved from the storage system to the secondary storage system as a result of the application of at least one new policy. In an example embodiment, the predicted output of the application of the new policy (based on the live and historical storage data analysis) may be:

```
Policy P1 = { Rule 1 :
{ "name":filesize,"Value":10,"Unit":"MB", "Op":">"},
{ "name":atime,"Value":6, "Unit": "month", "Op":">"}
}
```

Approximate primary storage space which will be freed for Filesystem1 upon application of P1=10 GB In an example embodiment, the policy proposal system 200 provides the new rule (comprising at least one expression) to a user for creation of at least one new policy. For example, the policy proposal system 200 may assist customer and service administrators of storage systems with the create of multiple policies.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

The above-described illustrative embodiments provide significant advantages relative to conventional approaches. For example, some embodiments are configured to significantly improve creation of optimized policies using a policy proposal system. These and other embodiments can optimize storage space consumption on the storage system using a policy proposal system relative to conventional approaches. Embodiments disclosed herein provide a user with predictive output to create a new policy that optimizes storage space consumption. Embodiments disclosed herein avoid reliance on users to manually configure policies that identify data to be transferred from the storage system to secondary storage. Embodiments disclosed herein provide intelligent management of primary and secondary storage space consumption.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of the information processing system 100, these platforms may also be used to implement at least portions of other information processing systems in other embodiments.

Figure 4:
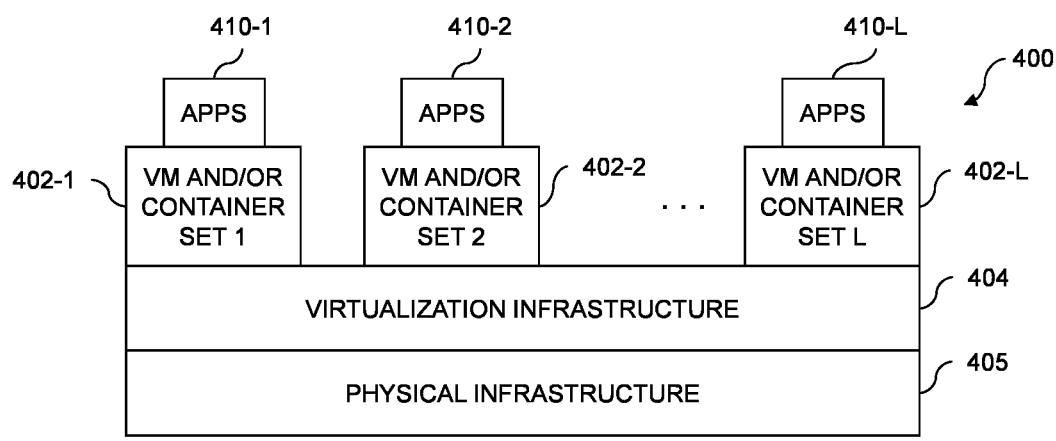
FIGS. 4 and 5 show examples of processing platforms that may be utilized to implement at least a portion of a policy proposal system embodiments in illustrative embodiments.
Figure 5:
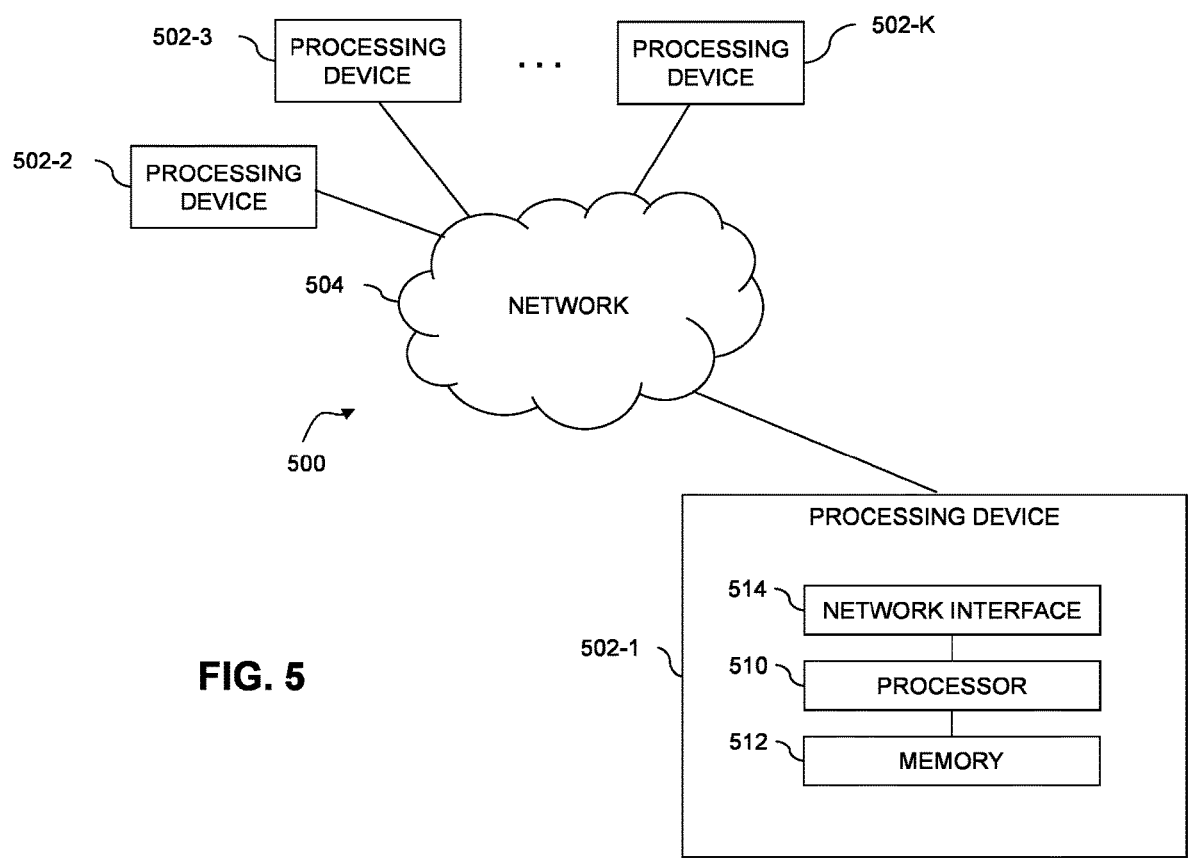

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for optimizing storage space consumption on the storage system using a policy proposal system as disclosed herein are illustratively implemented in the form of software running on one or more processing devices.

It should again be emphasized that the above-described embodiments are presented for purposes of illustration only. Many variations and other alternative embodiments may be used.

For example, the disclosed techniques are applicable to a wide variety of other types of information processing systems, storage systems, storage devices, policies, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
applying at least one policy to data stored on a storage system to identify matched data, wherein the matched data is data to be moved from the storage system to a secondary storage system, wherein a consumer module on the storage system pushes the at least one policy to a producer module residing on a storage device on the storage system;
identifying, by a policy proposal system, unmatched data stored on the storage system, wherein the unmatched data is data that is not identified as the data to be moved from the storage system to the secondary storage system, wherein the producer module gathers the unmatched data and transfers the unmatched data to the consumer module for analysis;
training, by the policy proposal system, a machine learning system with the matched data and the unmatched data;
predicting, by the trained machine learning system at least one new policy, wherein application of the at least one new policy identifies at least a subset of the unmatched data to be moved from the storage system to the secondary storage system, wherein the consumer module comprises a data analyzer engine that receives the unmatched data and provides the unmatched data to the machine learning system that resides on the data analyzer engine;
iteratively training the machine learning system with unmatched data that is produced as policies are applied to the storage system, wherein the method is performed by at least one processing device comprising a processor coupled to a memory;
generating, by the data analyzer engine, the at least one new policy based upon the prediction;
applying the at least one new policy to the data stored on the storage system; and
transferring, from the storage system to the secondary storage system, the at least subset of the unmatched data that matches the at least one new policy.

2. The method of claim 1 wherein predicting, by the trained machine learning system the at least one new policy comprises:
modifying the at least one policy.

3. The method of claim 1 further comprising:
predicting, by the machine learning system, an amount of data moved from the storage system to the secondary storage system as a result of the application of the at least one new policy.

4. The method of claim 1 further comprising:
predicting, by the trained machine learning system, the at least one new policy to optimize storage space consumption on the storage system.

5. The method of claim 1 further comprising:
predicting, by the trained machine learning system, the at least one new policy based on at least one of attributes of files associated with file systems residing on the storage system and ownership of the files associated with the file systems residing on the storage system.

6. The method of claim 1 further comprising:
analyzing, by the machine learning system, the unmatched data against the at least one policy.

7. The method of claim 1 further comprising:
analyzing, by the machine learning system, the unmatched data to identify the at least one new policy.

8. The method of claim 7 further comprising:
analyzing the unmatched data and historical data from a database comprising a plurality of policies.

9. The method of claim 1 wherein the predicting comprises:
predicting at least one new rule, wherein the at least one rule is comprised of at least one expression that, when applied to the data on the storage system, identifies data that matches the at least one expression, wherein the at least one policy is comprised of the at least one rule.

10. The method of claim 9 wherein predicting the at least one new rule comprises:
predicting the at least one expression that matches the subset of the unmatched data.

11. The method of claim 10 wherein the at least one expression comprises at least one of file size and access time of at least one file, wherein the at least one file resides on a storage device on the storage system.

12. The method of claim 10 further comprising:
providing, by the policy proposal system, the at least one new rule comprising the at least one expression to a user for creation of the at least one new policy; and
providing, by the policy proposal system, a prediction of an amount of data moved from the storage system to the secondary storage system as a result of application of the at least one new policy.

13. The method of claim 1 wherein the unmatched data is identified in response to the application of the at least one policy to the data stored on the storage system.

14. The method of claim 1 wherein the consumer module on the storage system comprises a data pool manager and the data analyzer engine, wherein the data pool manager receives the unmatched data and obtains the at least one policy from a database and transmits the at least one policy and the unmatched data to the data analyzer engine.

15. The method of Claim 1 wherein applying the at least one policy to data stored on a storage system comprises:
applying, by the producer module, the at least one policy to a storage device residing on the storage system; and
transferring, by the producer module, the unmatched data to the consumer module for analysis.

16. The method of claim 15 wherein applying, by the producer module, the at least one policy comprises:
gathering, by the producer module, the matched data and the unmatched data in response to the application of the at least one policy.

17. The method of claim 1 wherein predicting, by the trained machine learning system the at least one new policy comprises:
receiving, by the consumer module, the unmatched data, wherein the consumer module comprises a data pool manager and a data analyzer engine, wherein the data pool manager receives the unmatched data from the producer module, and wherein the machine learning system resides on the data analyzer engine.

18. The method of claim 17 wherein receiving, by the consumer module, the unmatched data comprises:
obtaining, by the data pool manager, the at least one policy from a database that comprises a plurality of policies; and
transmitting, by the data pool manager, the at least one policy, and the unmatched data to the data analyzer engine for analysis by the machine learning system.

19. A system comprising: at least one processing device comprising a processor coupled to a memory; the at least one processing device being configured:
to apply at least one policy to data stored on a storage system to identify matched data, wherein the matched data is data to be moved from the storage system to a secondary storage system, wherein a consumer module on the storage system pushes the at least one policy to a producer module residing on a storage device on the storage system;
to identify, by a policy proposal system, unmatched data stored on the storage system, wherein the unmatched data is data that is not identified as the data to be moved from the storage system to the secondary storage system, wherein the producer module gathers the unmatched data and transfers the unmatched data to the consumer module for analysis;
to train, by the policy proposal system, a machine learning system with the matched data and the unmatched data;
to predict, by the trained machine learning system at least one new policy, wherein application of the at least one new policy identifies at least a subset of the unmatched data to be moved from the storage system to the secondary storage system, wherein the consumer module comprises a data analyzer engine that receives the unmatched data and provides the unmatched data to the machine learning system that resides on the data analyzer engine;
iteratively training the machine learning system with unmatched data that is produced as policies are applied to the storage system;
to generate, by the data analyzer engine, the at least one new policy based upon the prediction;
to apply the at least one new policy to the data stored on the storage system; and to transfer, from the storage system to the secondary storage system, the at least subset of the unmatched data that matches the at least one new policy.

20. A computer program product comprising a non-transitory processor-readable storage medium having stored therein program code of one or more software programs, wherein the program code when executed by at least one processing device causes said at least one processing device:

to apply at least one policy to data stored on a storage system to identify matched data, wherein the matched data is data to be moved from the storage system to a secondary storage system, wherein a consumer module on the storage system pushes the at least one policy to a producer module residing on a storage device on the storage system;

to identify, by a policy proposal system, unmatched data stored on the storage system, wherein the unmatched data is data that is not identified as the data to be moved from the storage system to the secondary storage system, wherein the producer module gathers the unmatched data and transfers the unmatched data to the consumer module for analysis;

to train, by the policy proposal system, a machine learning system with the matched data and the unmatched data;

to predict, by the trained machine learning system at least one new policy, wherein application of the at least one new policy identifies at least a subset of the unmatched data to be moved from the storage system to the secondary storage system, wherein the consumer module comprises a data analyzer engine that receives the unmatched data and provides the unmatched data to the machine learning system that resides on the data analyzer engine;

iteratively training the machine learning system with unmatched data that is produced as policies are applied to the storage system;

to generate, by the data analyzer engine, the at least one new policy based upon the prediction;

to apply the at least one new policy to the data stored on the storage system; and to transfer, from the storage system to the secondary storage system, the at least subset of the unmatched data that matches the at least one new policy.

* * * * *